US011279353B2

(12) United States Patent
Ikeda et al.

(10) Patent No.: US 11,279,353 B2
(45) Date of Patent: Mar. 22, 2022

(54) LANE DEPARTURE PREVENTION APPARATUS

(71) Applicant: TOYOTA JIDOSHA KABUSHIKI KAISHA, Toyota (JP)

(72) Inventors: Masayuki Ikeda, Susono (JP); Ryo Inomata, Ashigarakami-gun (JP); Akira Nagae, Susono (JP); Hironori Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 16/861,722

(22) Filed: Apr. 29, 2020

(65) Prior Publication Data
US 2020/0255009 A1 Aug. 13, 2020

Related U.S. Application Data

(63) Continuation of application No. 15/864,110, filed on Jan. 8, 2018, now Pat. No. 10,688,992.

(30) Foreign Application Priority Data

Feb. 16, 2017 (JP) .............................. JP2017-026725

(51) Int. Cl.
*B60W 30/12* (2020.01)
*B60W 10/18* (2012.01)
(Continued)

(52) U.S. Cl.
CPC ............ *B60W 30/12* (2013.01); *B60W 10/18* (2013.01); *B60W 10/20* (2013.01); *B60W 30/10* (2013.01);
(Continued)

(58) Field of Classification Search
CPC ...... B60W 30/12; B60W 50/14; B60W 30/10; B60W 10/18; B60W 10/20;
(Continued)

(56) References Cited

U.S. PATENT DOCUMENTS

| 2005/0096829 | A1 | 5/2005 | Sugano et al. |
| 2015/0183430 | A1* | 7/2015 | Schwindt .............. B60W 30/09 701/23 |

(Continued)

FOREIGN PATENT DOCUMENTS

| JP | 2005-132183 A | 5/2005 |
| JP | 2008-285013 A | 11/2008 |

(Continued)

*Primary Examiner* — Thomas Ingram
(74) *Attorney, Agent, or Firm* — Sughrue Mion, PLLC

(57) ABSTRACT

A lane departure prevention apparatus (17) has: a departure preventing device (172) for preventing a vehicle (1) from departing from a driving lane by controlling at least one of a steering apparatus (142) and a braking apparatus (13) selected on the basis of a state of the vehicle, when it is determined that the vehicle may depart from the driving lane; and a determining device for determining whether or not an abnormality condition that it is difficult for a person to normally drive the vehicle is satisfied, the departure preventing device prevents the vehicle from departing from the driving lane by controlling the braking apparatus even if the state of the vehicle is not a predetermined state in which the departure preventing device should prevent the vehicle from departing from the driving lane by controlling the braking apparatus, when it is determined that the abnormality condition is satisfied.

4 Claims, 6 Drawing Sheets

(51) Int. Cl.
*B60W 10/20* (2006.01)
*G05D 1/02* (2020.01)
*B60W 50/14* (2020.01)
*B60W 30/10* (2006.01)

(52) U.S. Cl.
CPC .......... *B60W 50/14* (2013.01); *G05D 1/0246* (2013.01); *B60W 2050/143* (2013.01); *B60W 2420/42* (2013.01); *B60W 2520/10* (2013.01); *B60W 2520/105* (2013.01); *B60W 2520/14* (2013.01); *B60W 2520/28* (2013.01); *B60W 2540/22* (2013.01); *B60W 2540/26* (2013.01); *B60W 2554/00* (2020.02); *B60W 2710/18* (2013.01); *B60W 2710/20* (2013.01)

(58) Field of Classification Search
CPC ......... B60W 2550/10; B60W 2540/22; B60W 2520/28; B60W 2520/14; B60W 2520/105; B60W 2520/10; B60W 2050/143; B60W 2420/42; B60W 2710/20; B60W 2710/18; B60W 2540/26; G05D 1/0246

See application file for complete search history.

(56) References Cited

U.S. PATENT DOCUMENTS

| | | | |
|---|---|---|---|
| 2016/0250968 A1* | 9/2016 | Shirakata | B60K 28/066 340/576 |
| 2017/0305440 A1* | 10/2017 | Oba | B60W 50/08 |
| 2017/0364070 A1* | 12/2017 | Oba | B60W 60/0051 |
| 2018/0111628 A1* | 4/2018 | Tamagaki | B60W 30/16 |

FOREIGN PATENT DOCUMENTS

| | | |
|---|---|---|
| JP | 2012-532056 A | 12/2012 |
| JP | 2016-196285 A | 11/2016 |
| WO | 2011/002348 A1 | 1/2011 |

* cited by examiner

[FIG. 1]
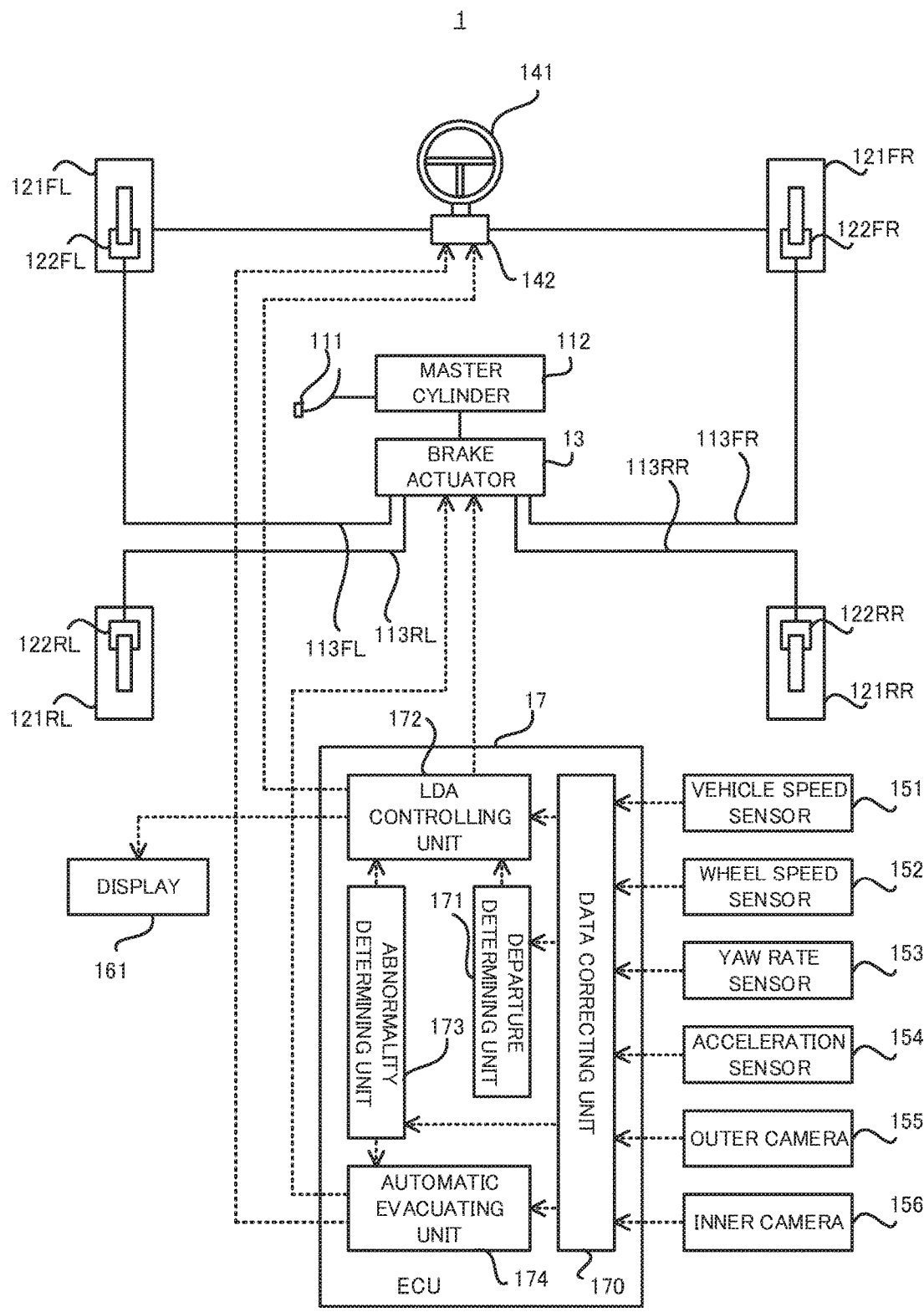

[FIG. 2]
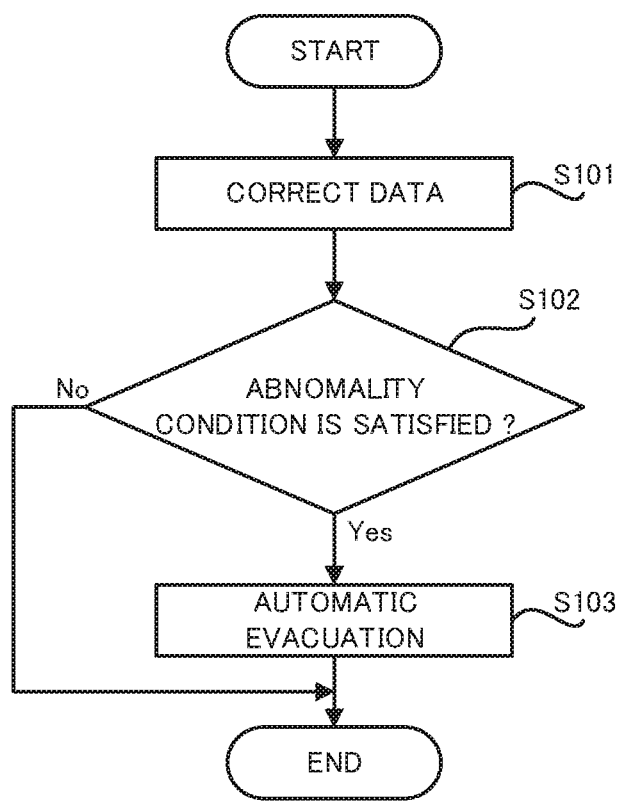

[FIG. 3]
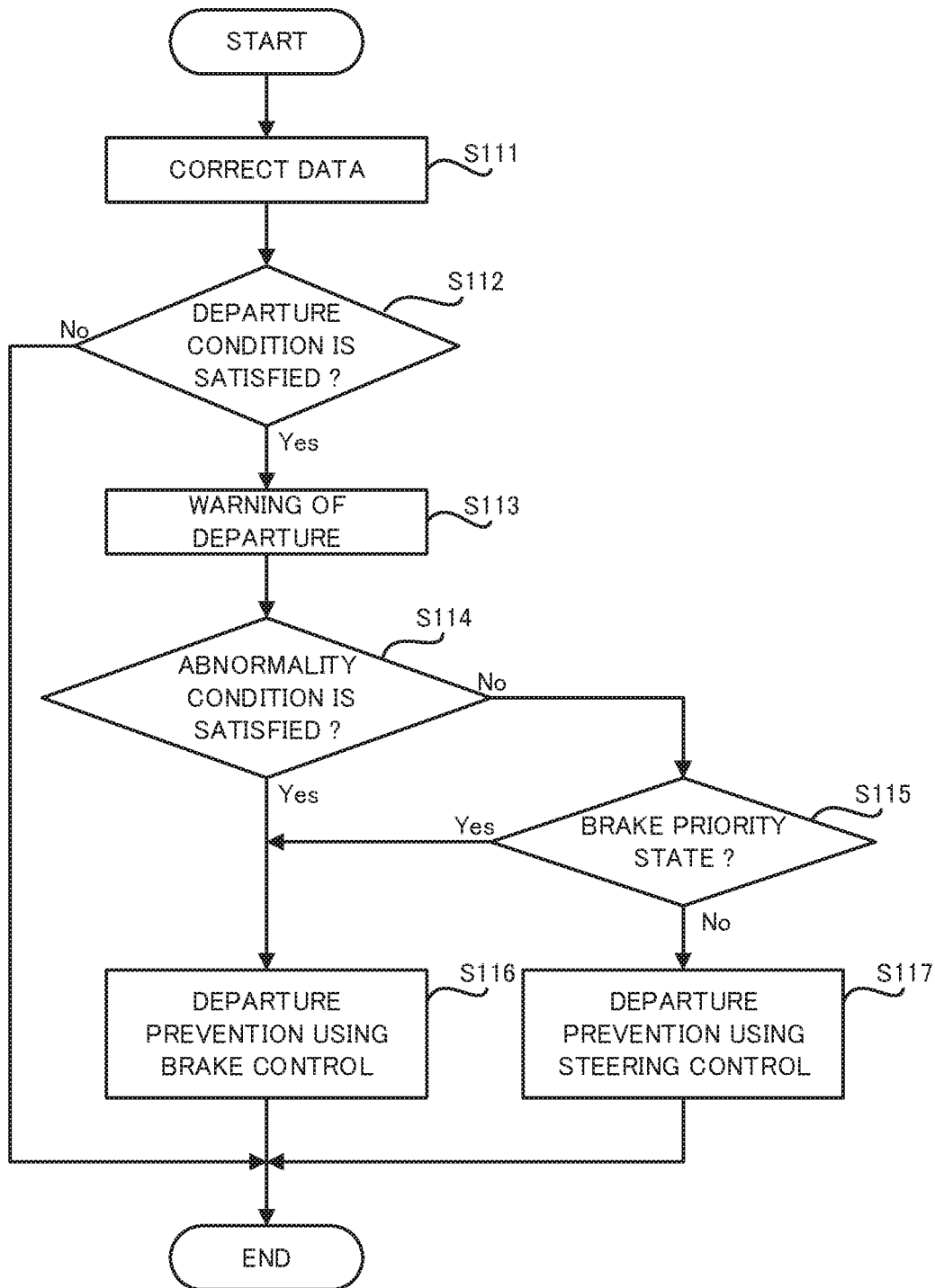

[FIG. 4]
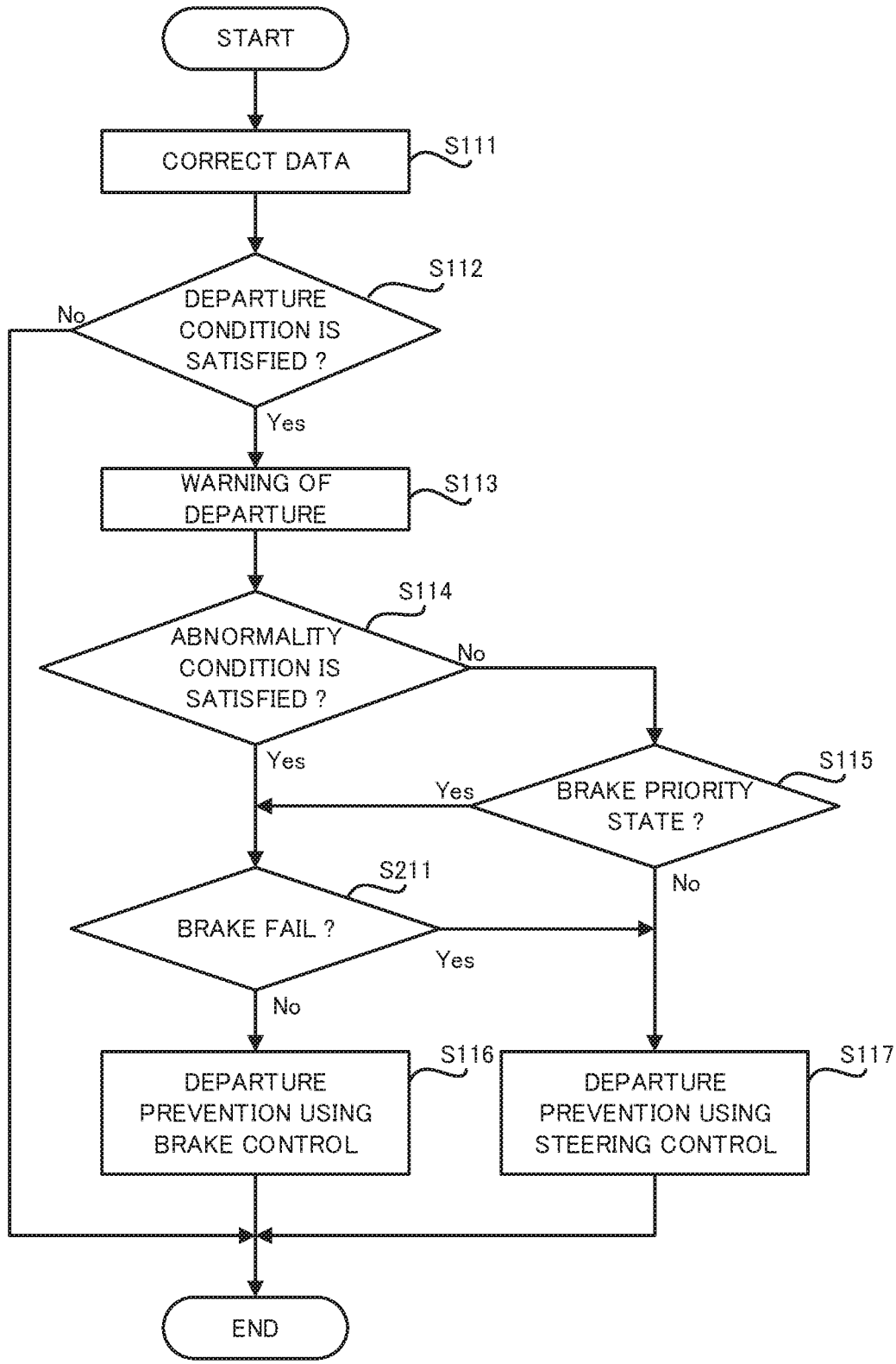

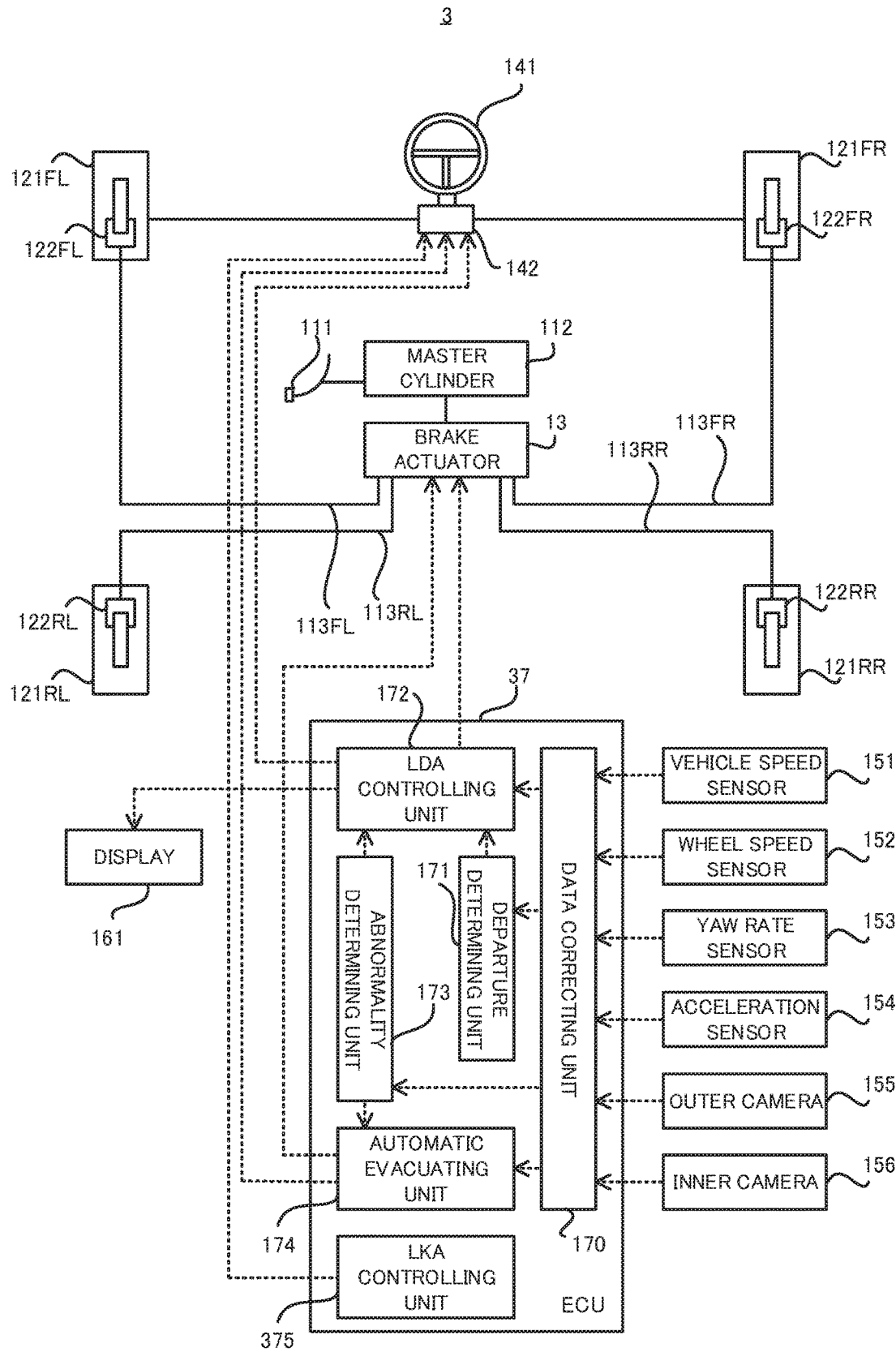
[FIG. 5]

[FIG. 6]
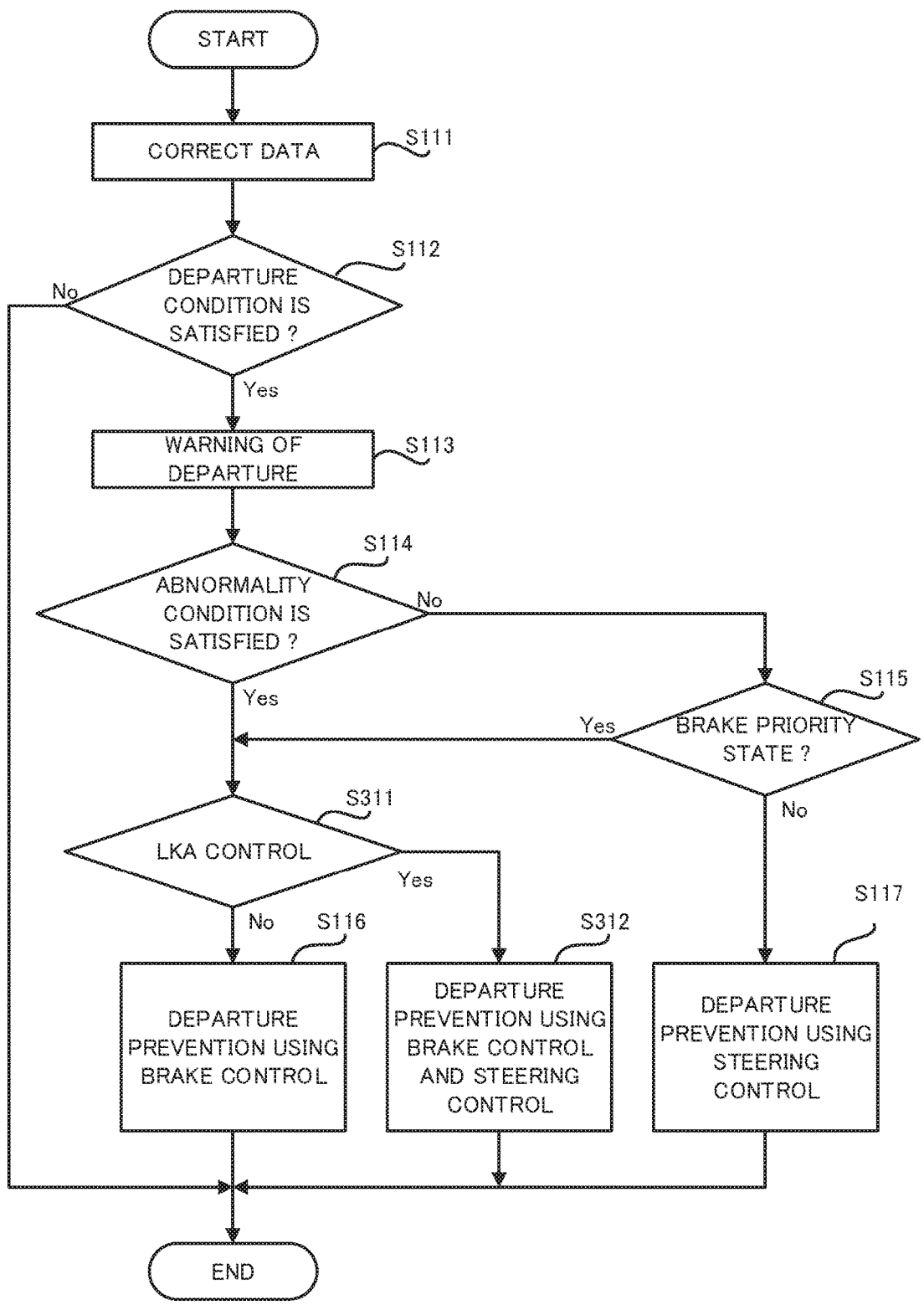

LANE DEPARTURE PREVENTION APPARATUS

CROSS REFERENCE TO RELATED APPLICATION

This application is a continuation of U.S. application Ser. No. 15/864,110 filed Jan. 8, 2018 (allowed), which claims priority from Japanese Patent Application No. 2017-026725 filed Feb. 16, 2017. The entire disclosures of the prior applications are considered part of the disclosure of the accompanying continuation application, and are hereby incorporated herein by reference in its entirety.

TECHNICAL FIELD

The present invention relates to a technical field of a lane departure prevention apparatus that is configured to prevent a vehicle from departing from a driving lane on which the vehicle is currently traveling.

BACKGROUND ART

One example of a lane departure prevention apparatus is disclosed in a Patent Literature 1. Specifically, the Patent Literature 1 discloses the lane departure prevention apparatus that is configured to prevent a vehicle from departing from a driving lane by activating a LKA (Lane Keep Assist) until it is determined that an abnormality of a person (for example, a driver) in the vehicle continues to be detected and thus the person is in a driving-impossible-state (namely, the person cannot drive the vehicle) after the abnormality of the person is detected, wherein the LKA is an operation for allowing the vehicle to travel (namely, move or run) along the driving lane.

CITATION LIST

Patent Literature

[Patent Literature 1] Japanese Unexamined Patent Application Publication No. 2016-196285

SUMMARY OF INVENTION

Technical Problem

The lane departure prevention apparatus disclosed in the Patent Literature 1 prevents the vehicle from departing from the driving lane by applying, to a handle (namely, a steering wheel), a steering force that is allowed to prevent the vehicle from approaching a zoning line (for example, a white line) that zones the driving lane. However, when it is difficult for the person to drive the vehicle, there is a possibility that the person loses consciousness and falls onto or leans against the handle. In this case, there is a possibility that the handle is substantially immovable (in other words, fixed) by the unconscious person. As a result, even if the steering force for preventing the vehicle from departing from the driving lane is applied to the handle, there is a possibility that the steering force applied to the handle cannot turn turned wheels that is coupled to the handle. Thus, there is a possibility that the lane departure prevention apparatus disclosed in the Patent Literature 1 cannot prevent the vehicle from departing from the driving lane in the situation where it is difficult for the person to normally drive the vehicle.

The above described technical problem is one example of the technical problem that is to be solved by the present invention. It is therefore an object of the present invention to provide, for example, a lane departure prevention apparatus that is configured to appropriately prevent the vehicle from departing from the driving lane even in the situation where it is difficult for the person in the vehicle to normally drive the vehicle.

Solution to Problem

<1>

One aspect of a lane departure prevention apparatus has a controller, the controller is programmed to: determine whether or not a departure condition is satisfied, the departure condition being a condition that there is a possibility that a vehicle departs from a driving lane on which the vehicle is currently traveling; prevent the vehicle from departing from the driving lane by controlling at least one of a steering apparatus and a braking apparatus of the vehicle that is selected on the basis of a traveling state of the vehicle, when it is determined that the departure condition is satisfied; and determine whether or not a predetermined abnormality condition is satisfied, the abnormality condition is a condition that it is difficult for a person in the vehicle to normally drive the vehicle, the controller is programmed to prevent the vehicle from departing from the driving lane by controlling at least the braking apparatus even if the traveling state of the vehicle is not a predetermined state in which the controller should prevent the vehicle from departing from the driving lane by controlling the braking apparatus, when it is determined that the departure condition and the abnormality condition are satisfied.

Alternatively, one aspect of a lane departure prevention apparatus may have: a first determining device that is configured to determine whether or not a departure condition is satisfied, the departure condition being a condition that there is a possibility that a vehicle departs from a driving lane on which the vehicle is currently traveling; a departure preventing device that is configured to prevent the vehicle from departing from the driving lane by controlling at least one of a steering apparatus and a braking apparatus of the vehicle that is selected on the basis of a traveling state of the vehicle, when it is determined that the departure condition is satisfied; and a second determining device that is configured to determine whether or not a predetermined abnormality condition is satisfied, the abnormality condition is a condition that it is difficult for a person in the vehicle to normally drive the vehicle, the departure preventing device is configured to prevent the vehicle from departing from the driving lane by controlling at least the braking apparatus even if the traveling state of the vehicle is not a predetermined state in which the departure preventing device should prevent the vehicle from departing from the driving lane by controlling the braking apparatus, when it is determined that the departure condition and the abnormality condition are satisfied.

According to one aspect of the lane departure prevention apparatus, the departure of the vehicle from the driving lane is prevented by controlling the braking apparatus to apply braking force to the vehicle, when it is determined that the abnormality condition is satisfied. Thus, the departure of the vehicle from the driving lane is appropriately prevented, even if the person loses the consciousness and falls onto or leans against a handle of the vehicle and thus it is determined that the abnormality condition is satisfied. Namely, the lane departure prevention apparatus is capable of appropriately prevent the vehicle from departing from the driving lane in the situation where it is difficult for the person in the vehicle to normally drive the vehicle.

<2>

In another aspect of the above described lane departure prevention apparatus, the controller is programmed to prevent the vehicle from departing from the driving lane by controlling at least the braking apparatus, when it is determined that the departure condition and the abnormality condition are satisfied, the controller is programmed to prevent the vehicle from departing from the driving lane by controlling at least one of the braking apparatus and the steering apparatus, when it is determined that the departure condition is satisfied and the abnormality condition is not satisfied.

Alternatively, in another aspect of the above described lane departure prevention apparatus that has the departure preventing device, the departure preventing device is configured to prevent the vehicle from departing from the driving lane by controlling at least the braking apparatus, when it is determined that the departure condition and the abnormality condition are satisfied, the departure preventing device is configured to prevent the vehicle from departing from the driving lane by controlling at least one of the braking apparatus and the steering apparatus, when it is determined that the departure condition is satisfied and the abnormality condition is not satisfied.

According to this aspect, the departure of the vehicle from the driving lane is prevented by controlling at least one of the steering apparatus and the braking apparatus that is selected on the basis of the traveling state of the vehicle as a usual case, when it is determined that the abnormality condition is not satisfied. On the other hand, the departure of the vehicle from the driving lane is prevented by controlling the braking apparatus as an exceptional case, when it is determined that the abnormality condition is satisfied. Thus, the lane departure prevention apparatus is capable of appropriately prevent the vehicle from departing from the driving lane in the situation where the person in the vehicle has any abnormality.

Note that the controller may be programmed to prevent the vehicle from departing from the driving lane by controlling at least the braking apparatus, when it is determined that the departure condition is satisfied and the abnormality condition is not satisfied and the traveling state of the vehicle is the predetermined condition, the controller may be programmed to prevent the vehicle from departing from the driving lane by controlling at least the steering apparatus, when it is determined that the departure condition is satisfied and the abnormality condition is not satisfied and the traveling state of the vehicle is another condition in which the controller should prevent the vehicle from departing from the driving lane by controlling the steering apparatus, and the controller may be programmed to prevent the vehicle from departing from the driving lane by controlling at least the braking apparatus, when it is determined that the departure condition and the abnormality condition is satisfied, regardless of the traveling state of the vehicle being the predetermined condition or the another condition. Alternatively, the departure preventing device may be configured to prevent the vehicle from departing from the driving lane by controlling at least the braking apparatus, when it is determined that the departure condition is satisfied and the abnormality condition is not satisfied and the traveling state of the vehicle is the predetermined condition, the departure preventing device may be configured to prevent the vehicle from departing from the driving lane by controlling at least the steering apparatus, when it is determined that the departure condition is satisfied and the abnormality condition is not satisfied and the traveling state of the vehicle is another condition in which the controller should prevent the vehicle from departing from the driving lane by controlling the steering apparatus, and the departure preventing device may be configured to prevent the vehicle from departing from the driving lane by controlling at least the braking apparatus, when it is determined that the departure condition and the abnormality condition is satisfied, regardless of the traveling state of the vehicle being the predetermined condition or the another condition.

<3>

In another aspect of the above described lane departure prevention apparatus, an operation state of the controller is changed between an ON state in which the controller is allowed to control at least one of the steering apparatus and the braking apparatus and an OFF state in which the controller does not control both of the steering apparatus and the braking apparatus, the controller is programmed to change the operation state to the ON state and then to prevent the vehicle from departing from the driving lane by controlling at least the braking apparatus, when it is determined that the departure condition and the abnormality condition are satisfied and the operation state is the OFF state.

Alternatively, in another aspect of the above described lane departure prevention apparatus that has the departure preventing device, an operation state of the departure preventing device is changed between an ON state in which the departure preventing device is allowed to control at least one of the steering apparatus and the braking apparatus and an OFF state in which the departure preventing device does not control both of the steering apparatus and the braking apparatus, the departure preventing device is configured to change the operation state to the ON state and then to prevent the vehicle from departing from the driving lane by controlling at least the braking apparatus, when it is determined that the departure condition and the abnormality condition are satisfied and the operation state is the OFF state.

According to this aspect, even if the operational state of the controller or the departure preventing device is the OFF state at the timing when it is determined that the abnormality condition is satisfied, the operational state of the controller or the departure preventing device is changed to the ON state after it is determined that the abnormality condition is satisfied. Thus, the departure of the vehicle from the driving lane is prevented by using the braking apparatus. Therefore, it is possible to increase an opportunity that the departure of the vehicle from the driving lane is prevented. Thus, the lane departure prevention apparatus is capable of appropriately prevent the vehicle from departing from the driving lane in the situation where the person in the vehicle has any abnormality.

<4>

In another aspect of the above described lane departure prevention apparatus, the controller is further programmed to control the steering apparatus so that the vehicle travels within the driving lane, regardless of the possibility that the vehicle departs from the driving lane, the controller is programmed to prevent the vehicle from departing from the driving lane by controlling the steering apparatus and the braking apparatus, when it is determined that the departure condition and the abnormality condition are satisfied and the controller controls the steering apparatus so that the vehicle travels within the driving lane, the controller is programmed to prevent the vehicle from departing from the driving lane by controlling the braking apparatus, when it is determined that the departure condition and the abnormality condition are satisfied and the controller does not control the steering apparatus so that the vehicle travels within the driving lane.

Alternatively, in another aspect of the above described lane departure prevention apparatus that has the departure preventing device, the lane departure prevention apparatus further comprises a lane keeping device that is configured to control the steering apparatus so that the vehicle travels within the driving lane, regardless of the possibility that that the vehicle departs from the driving lane, the departure preventing device is configured to prevent the vehicle from departing from the driving lane by controlling the steering apparatus and the braking apparatus, when it is determined that the departure condition and the abnormality condition are satisfied and the lane keeping device controls the steering apparatus, the departure preventing device is configured to prevent the vehicle from departing from the driving lane by controlling the braking apparatus, when it is determined that the departure condition and the abnormality condition are satisfied and the lane keeping device does not control the steering apparatus.

According to this aspect, when it is determined that the departure condition and the abnormality condition are satisfied and the controller or the lane keeping device controls the steering apparatus, the departure of the vehicle from the driving lane is prevented by using not only the braking apparatus but also the steering apparatus that is already controlled.

BRIEF DESCRIPTION OF DRAWINGS

FIG. 1 is a block diagram that illustrates a structure of a vehicle in a first embodiment.

FIG. 2 is a flowchart that illustrates a flow of an automatic evaluation operation in the first embodiment.

FIG. 3 is a flowchart that illustrates a flow of a departure prevention operation in the first embodiment.

FIG. 4 is a flowchart that illustrates a flow of a departure prevention operation in a second embodiment.

FIG. 5 is a block diagram that illustrates a structure of a vehicle in a third embodiment.

FIG. 6 is a flowchart that illustrates a flow of a departure prevention operation in the third embodiment.

DESCRIPTION OF EMBODIMENTS

In the following description, with reference to drawings, one embodiment of a lane departure prevention apparatus of the present invention will be described. In the following description, a vehicle 1 to which one embodiment of the lane departure prevention apparatus of the present invention is adapted will be described.

(1) First Embodiment (1-1) Structure of Vehicle 1

Firstly, with reference to a block diagram that is illustrated in FIG. 1, the structure of the vehicle 1 of the first embodiment will be explained. As illustrated in FIG. 1, the vehicle 1 has: a brake pedal 111; a master cylinder 112; a brake pipe 113FL; a brake pipe 113RL; a brake pipe 113FR; a brake pipe 113RR; a left front wheel 121FL; a left rear wheel 121RL; a right front wheel 121FR; a right rear wheel 121RR; a wheel cylinder 122FL; a wheel cylinder 122RL; a wheel cylinder 122FR; a wheel cylinder 122RR; a brake actuator 13 that is one specific example of the above described "braking apparatus"; a steering wheel 141, a steering actuator 142 that is one example of the above described "steering apparatus"; a vehicle speed sensor 151; a wheel speed sensor 152; a yaw rate sensor 153; an acceleration sensor 154; an outer camera 155; an inner camera 156; a display 161; and an ECU (Electronic Control Unit) 17 that is one example of the above described "lane departure prevention apparatus".

The brake pedal 111 is a pedal that is pedaled by a driver to brake the vehicle 1. The master cylinder 112 is configured to adjust pressure of brake fluid (alternatively, any fluid) in the master cylinder 112 so that the pressure of the brake fluid is equal to pressure based on a pedaled amount of the brake pedal 111. The pressure of the brake fluid in the master cylinder 112 is transmitted to the wheel cylinder 122FL, the wheel cylinder 122RL, the wheel cylinder 122FR and the wheel cylinder 122RR through the brake pipe 113FL, the brake pipe 113RL, the brake pipe 113FR and the brake pipe 113RR, respectively. Thus, the braking forces based on the pressure of the brake fluid transmitted to the wheel cylinder 122FL, the wheel cylinder 122RL, the wheel cylinder 122FR and the wheel cylinder 122RR are applied to the left front wheel 121FL, the left rear wheel 121RL, the right front wheel 121FR and the right rear wheel 121RR, respectively.

The brake actuator 13 is configured to adjust the pressure of the brake fluid transmitted to each of the wheel cylinder 122FL, the wheel cylinder 122RL, the wheel cylinder 122FR and the wheel cylinder 122RR under the control of the ECU 17, independently from the pedaled amount of the brake pedal 111. Therefore, the brake actuator 13 is configured to adjust the braking force applied to each of the left front wheel 121FL, the left rear wheel 121RL, the right front wheel 121FR and the right rear wheel 121RR, independently from the pedaled amount of the brake pedal 111.

The steering wheel 141 is an operational device that is operated by the driver to steer the vehicle 1 (namely, to turn turned wheels). Note that each of the left front wheel 121FL and the right front wheel 121FR corresponds to the turned wheel in the first embodiment.

The steering actuator 142 is configured to adjust a turned angle of the turned wheels under the control of the ECU 17, independently from the operated amount of the steering wheel 141. Therefore, the steering actuator 142 is configured to adjust a traveling direction (in other words, a turned direction) of the vehicle 1, independently from the operated amount of the steering wheel 141. Namely, the steering actuator 142 substantially constitutes an EPS (Electric Power Steering). Note that the steering actuator 142 is configured to rotate the steering wheel 141 that is coupled to the turned wheels simultaneously with turning the turned wheels.

The vehicle speed sensor 151 is configured to detect vehicle speed Vv of the vehicle 1. The wheel speed sensor 152 is configured to detect wheel speed Vw of each of the left front wheel 121FL, the left rear wheel 121RL, the right front wheel 121FR and the right rear wheel 121RR. The yaw rate sensor 153 is configured to detect yaw rate γ of the vehicle 1. The acceleration sensor 154 is configured to detect acceleration G (specifically, acceleration Gx in a longitudinal direction (in other words, a front-back direction) and acceleration Gy in a lateral direction (in other words, a right-left direction)) of the vehicle 1. The outer camera 155 is an imaging device that is configured to capture an outer circumstance in front of the vehicle 1. The inner camera 156 is an imaging device that is configured to capture a circumstance in a vehicle interior of the vehicle 1 (especially, a circumstance of the person in the vehicle 1). Detection data that represents the detection result of the vehicle speed sensor 151 to the acceleration sensor 154, outer image data that represents an outer image captured by the outer camera 155 and inner image data that represents an inner image captured by the inner camera 156 are outputted to the ECU 17.

The display 161 is configured to display any information under the control of the ECU 17.

The ECU 17 is configured to control entire operation of the vehicle 1. Especially in the first embodiment, the ECU 17 is configured to perform an automatic evacuation operation for automatically evacuating (specifically, stopping) the vehicle 1 when it is difficult for the person in the vehicle 1 to normally drive the vehicle 1. Therefore, the ECU 17 is configured to function as a controlling apparatus for realizing what we call deadman system. Moreover, in the first embodiment, the ECU 17 is configured to perform a departure prevention operation for preventing the vehicle 1 from departing (in other words, deviating) from a driving lane on which the vehicle 1 is currently traveling (in other words, moving). Therefore, the ECU 17 is configured to function as a controlling apparatus for realizing what we call LDA (Lane Departure Alert) or LDP (Lane Departure Prevention).

In order to perform the automatic evacuation operation and the departure prevention operation, the ECU 17 includes, as processing blocks that are logically realized in the ECU 17 or processing circuits that are physically realized in the ECU 17, a data correcting unit 170, a departure determining unit 171 that is one example of the above described "first determining device", a LDA controlling unit 172 that is one specific example of the above described "departure preventing device", an abnormality determining unit 173 that is one example of the above described "second determining device" and an automatic evacuating unit 174. Although an operation of each of the data correcting unit 170, the departure determining unit 171, the LDA controlling unit 172, the abnormality determining unit 173 and the automatic evacuating unit 174 will be described later in detail with reference to FIG. 2 and so on, overview of the operation will be briefly described here. The data correcting unit 170 is configured to correct the detection data that represents the detection result of the vehicle speed sensor 151 to the acceleration sensor 154, the outer image data that represents the outer image captured by the outer camera 155 and the inner image data that represents the inner image captured by the inner camera 156. The departure determining unit 171 is configured to determine on the basis of the detection data and the outer image data corrected by the data correcting unit 170 whether or not a departure condition is satisfied. The departure condition is a condition that there is a possibility that the vehicle 1 departs from the driving lane on which the vehicle 1 is currently traveling. The LDA controlling unit 172 is configured to prevent the vehicle 1 from departing from the driving lane by controlling at least one of the steering actuator 142 and the brake actuator 13 when the departure determining unit 171 determines that the departure condition is satisfied. Namely, the LDA controlling unit 172 is configured to prevent the vehicle 1 from departing from the driving lane by controlling at least one of the traveling direction of the vehicle 1 and the braking force applied to the vehicle 1. Note that "preventing the vehicle 1 from departing from the driving lane" in the first embodiment means allowing a distance by which the vehicle 1 actually departs from the driving lane when at least one of the traveling direction and the braking force is controlled to be smaller than a distance by which the vehicle 1 is predicted to depart from the driving lane when the traveling direction and the braking force are not controlled. The abnormality determining unit 173 is configured to determine on the basis of the inner image data corrected by the data correcting unit 170 whether or not an abnormality condition is satisfied. The abnormality condition is a condition that it is difficult for the person in the vehicle 1 to normally drive the vehicle 1. The automatic evacuating unit 174 is configured to automatically evacuate the vehicle 1 to a desired evacuation place to which the vehicle 1 is allowed to evacuate safely by controlling at least one of the brake actuator 13 and the steering actuator 142 when the abnormality determining unit 173 determines that the abnormality condition is satisfied.

(1-2) Operation Performed by ECU in First Embodiment

Next, the automatic evacuation operation and the lane departure prevention operation that are performed by the ECU 17 will be described in order. Note that it is preferable that the automatic evacuation operation and the lane departure prevention operation are performed in parallel. However, the lane departure prevention operation may be performed when the automatic evacuation operation is not performed.

(1-2-1) Flow of Automatic Evacuation Operation in First Embodiment

Firstly with reference to a flowchart illustrated in FIG. 2, a flow of the automatic evacuation operation will be described. As illustrated in FIG. 2, firstly, the data correcting unit 170 corrects the detection data that represents the detection result of the vehicle speed sensor 151 to the acceleration sensor 154, the outer image data that represents the outer image captured by the outer camera 155 and the inner image data that represents the inner image captured by the inner camera 156 (a step S101).

Then, the abnormality determining unit 173 determines on the basis of the inner image data corrected at the step S101 whether or not the abnormality condition that it is difficult for the person in the vehicle 1 to normally drive the vehicle 1 is satisfied (a step S102). The abnormality determining unit 173 may use, as an operation for determining whether or not the abnormality condition is satisfied, an existing operation (for example, an operation described in the Patent Literature 1). In the following description, one example of the operation for determining whether or not the abnormality condition is satisfied will be described. For example, the abnormality determining unit 173 may identify a direction of a face of the person in the vehicle 1 by analyzing the image in the vehicle interior (especially, the image of the person in the vehicle 1) represented by the inner image data, and then, may determine that the abnormality condition is satisfied when a state where the person in the vehicle 1 does not face the front is kept for over a first predetermined time. For example, the abnormality determining unit 173 may identify an opening degree of eyes of the person in the vehicle 1 by analyzing the image in the vehicle interior (especially, the image of the person in the vehicle 1) represented by the inner image data, and then, may determine that the abnormality condition is satisfied when a state where the person in the vehicle 1 closes his eyes is kept for over a second predetermined time. Note that each of a situation where the person in the vehicle 1 dies suddenly and a situation where the person in the vehicle 1 loses his consciousness is one example of the situation where the abnormality condition is satisfied.

As a result of the determination at the step S102, if it is determined that the abnormality condition is not satisfied (the step S102: No), the ECU 17 terminates the automatic evacuation operation illustrated in FIG. 2. If the automatic evacuation operation illustrated in FIG. 2 is terminated, the ECU 17 may start the automatic evacuation operation illustrated in FIG. 2 again after a first restart period (for example, several milli seconds to several dozen milli second) has elapsed. Namely, the automatic evacuation operation illustrated in FIG. 2 is performed periodically with the first restart period.

On the other hand, as a result of the determination at the step S102, if it is determined that the abnormality condition is satisfied (the step S102: Yes), the automatic evacuating unit 174 automatically evacuates the vehicle 1 to the desired evacuation place to which the vehicle 1 is allowed to evacuate safely by controlling at least one of the brake actuator 13 and the steering actuator 142 (a step S103). The automatic evacuating unit 174 may use, as an operation for automatically evacuating the vehicle 1, an existing operation (for example, an operation described in the Patent Literature 1). In the following description, one example of the operation for automatically evacuating the vehicle 1 will be described. For example, the automatic evacuating unit 174 may identify the desired evacuation place on the basis of the outer image data corrected at the step S101. Each of a side strip, a parking site and the like is one example of the desired evacuation place. Then, the automatic evacuating unit 174 calculates a route from the current position of the vehicle 1 to the desired evacuating place. Then, the automatic evacuating unit 174 controls at least one of the brake actuator 13 and the steering actuator 142 (moreover, a power source such as an engine or a motor, if needed) so that the vehicle 1 moves along the calculated route and stops at the desired evacuation place. As a result, the vehicle 1 stops at the desired evacuation place without the operation of the person in the vehicle 1.

(1-2-2) Flow of Lane Departure Prevention Operation in First Embodiment

Next, with reference to a flowchart illustrated in FIG. 3, a flow of the lane departure prevention operation performed in the first embodiment will be described. As illustrated in FIG. 3, firstly, the data correcting unit 170 corrects the detection data that represents the detection result of the vehicle speed sensor 151 to the acceleration sensor 154 and the outer image data that represents the outer image captured by the outer camera 155 (a step S111).

Then, the departure determining unit 171 determines whether or not the departure condition that there is a possibility that the vehicle 1 departs from the driving lane on which the vehicle 1 currently traveling is satisfied (a step S112). The departure determining unit 171 may use, as an operation for determining whether or not the departure condition is satisfied, an existing operation. In the following description, one example of the operation for determining whether or not the departure condition is satisfied will be described. For example, the departure determining unit 171 may detect, in the outer image, a white line (alternatively, any lane edge) that zones the driving lane on which the vehicle 1 is currently traveling by analyzing the outer image data corrected at the step S111. Moreover, the departure determining unit 171 may estimate, on the basis of the detection date corrected at the step S111, a traveling area at which the vehicle 1 will travel (in other words, move or pass through) before a third predetermined time (for example, a time necessary for the vehicle 1 to travel by a distance corresponding to a front watching distance) has elapsed from now. Then, the departure determining unit 171 may determine on the basis of the detected white line and the estimated traveling area whether or not the vehicle 1 crosses over or is on the white line within the third predetermine time. If it is determined that the vehicle 1 crosses over or is on the white line within the third predetermine time, the departure determining unit 171 may determine that the departure condition is satisfied.

As a result of the determination at the step S112, if it is determined that the departure condition is not satisfied (the step S112: No), the lane departure prevention operation illustrated in FIG. 3 is terminated. If the lane departure prevention operation illustrated in FIG. 3 is terminated, the ECU 17 may start the lane departure prevention operation illustrated in FIG. 3 again after a second restart period (for example, several milli seconds to several dozen milli second) has elapsed. Namely, the lane departure prevention operation illustrated in FIG. 3 is performed periodically with the second restart period.

On the other hand, as a result of the determination at the step S112, if it is determined that the departure condition is satisfied (the step S112: Yes), the LDA controlling unit 172 warns the driver that there is a possibility that the vehicle 1 departs from the driving lane (a step S113). For example, the LDA controlling unit 172 may control the display 161 to display the image for informing that there is a possibility that the vehicle 1 departs from the driving lane.

Moreover, if it is determined that the departure condition is satisfied, the abnormality determining unit 173 determines whether or not the abnormality condition is satisfied (a step S114). Note that the process at the step S114 is same as the above described process as the step S102. Therefore, if the automatic evacuation operation is performed in parallel with the lane departure prevention operation, the determination result of the abnormality determining unit 173 in the automatic evacuation operation may be used in the lane departure prevention operation, instead of performing the process at the step S114.

As a result of the determination at the step S114, if it is determined that the abnormality condition is not satisfied (the step S114: No), the LDA controlling unit 172 prevents the vehicle 1 from departing from the driving lane by controlling at least one of the steering actuator 142 and the brake actuator 13.

Specifically, the LDA controlling unit 172 selects, as a controlled target that is used to prevent the vehicle 1 from departing from the driving lane, at least one of the steering actuator 142 and the brake actuator 13 on the basis of a traveling state of the vehicle 1. In order to select the controlled target, the LDA controlling unit 172 determines whether or not the traveling state of the vehicle 1 is a brake priority state in which preventing the vehicle 1 from departing from the driving lane by controlling the brake actuator 13 is prioritized more than preventing the vehicle 1 from departing from the driving lane by controlling the steering actuator 142 (a step S115). The brake priority state is a traveling state that is determined in advance for each vehicle 1 on the basis of at least one of a characteristics of the vehicle 1, a degree of safety in preventing the vehicle 1 from departing from the driving lane by controlling the steering actuator 142, a degree of safety in preventing the vehicle 1 from departing from the driving lane by controlling the brake actuator 13 and the like. Note that the brake priority state is one specific example of the above described "predetermined state".

As a result of the determination at the step S115, if it is determined that the traveling state of the vehicle 1 is the brake priority state (the step S115: Yes), the LDA controlling unit 172 prevents the vehicle 1 from departing from the driving lane by controlling the brake actuator 13 (a step S116). Specifically, for example, if it is determined that there is a possibility that the vehicle 1 departs from the driving lane to get across the white line that is located at the right side with respect to a traveling direction (in other words, a moving direction) of the vehicle 1, the vehicle 1 is preferably turned toward the left with respect to the traveling direction of the vehicle 1 in order to prevent the vehicle 1 from departing from the driving lane. In this case, the LDA controlling unit 172 controls the brake actuator 13 so that the braking force is applied to at least one of the left front wheel 121FL and the left rear wheel 121RL and the braking force is not applied to each of the right front wheel 121FR and the right rear wheel 121RR or the relatively small braking force is applied to at least one of the right front wheel 121FR and the right rear wheel 121RR and the relatively large braking force is applied to at least one of the left front wheel 121FL and the left rear wheel 121RL. On the other hand, if it is determined that there is a possibility that the vehicle 1 departs from the driving lane to get across the white line that is located at the left side with respect to the traveling direction of the vehicle 1, the LDA controlling unit 172 controls the brake actuator 13 so that the braking force is applied to at least one of right front wheel 121FR and the right rear wheel 121RR and the braking force is not applied to each of the left front wheel 121FL and the left rear wheel 121RL or the relatively small braking force is applied to at least one of the left front wheel 121FL and the left rear wheel 121RL and the relatively large braking force is applied to at least one of the right front wheel 121FR and the right rear wheel 121RR.

On the other hand, as a result of the determination at the step S115, if it is determined that the traveling state of the vehicle 1 is not the brake priority state (the step S115: No), the traveling state of the vehicle 1 is estimated to be a steering priority state at which preventing the vehicle 1 from departing from the driving lane by controlling the steering actuator 142 is prioritized more than preventing the vehicle 1 from departing from the driving lane by controlling the brake actuator 13. The steering priority state is also a traveling state that is determined in advance for each vehicle 1 on the basis of at least one of the characteristics of the vehicle 1, the degree of safety in preventing the vehicle 1 from departing from the driving lane by controlling the steering actuator 142, the degree of safety in preventing the vehicle 1 from departing from the driving lane by controlling the brake actuator 13 and the like, as with the brake priority state. In this case, the LDA controlling unit 172 prevents the vehicle 1 from departing from the driving lane by controlling the steering actuator 142 (a step S117). Specifically, for example, if it is determined that there is a possibility that the vehicle 1 departs from the driving lane to get across the white line that is located at the right side with respect to the traveling direction of the vehicle 1, the LDA controlling unit 172 controls the steering actuator 142 to turn the vehicle 1 toward the left with respect to the traveling direction of the vehicle 1. On the other hand, if it is determined that there is a possibility that the vehicle 1 departs from the driving lane to get across the white line that is located at the left side with respect to the traveling direction of the vehicle 1, the LDA controlling unit 172 controls the steering actuator 142 to turn the vehicle 1 toward the right with respect to the traveling direction of the vehicle 1.

On the other hand, as a result of the determination at the step S114, if it is determined that the abnormality condition is satisfied (the step S114: Yes), the LDA controlling unit 172 prevents the vehicle 1 from departing from the driving lane by controlling the brake actuator 13 (the step S116). Namely, if it is determined that the abnormality condition is satisfied, the brake actuator 13 is controlled to prevent the vehicle 1 from departing from the driving lane, regardless of the traveling state of the vehicle 1 (namely, regardless of the traveling state of the vehicle 1 being the brake priority state or the steering priority state).

As described above, according to the first embodiment, if the abnormality condition is not satisfied, the LDA controlling unit 172 prevents the vehicle 1 from departing from the driving lane by controlling at least one of the brake actuator 13 and the steering actuator 142 that is selected on the basis of the traveling state of the vehicle 1 as a usual case. On the other hand, if the abnormality condition is satisfied, the LDA controlling unit 172 prevents the vehicle 1 from departing from the driving lane by controlling the brake actuator 13 as an exceptional case. Thus, the LDA controlling unit 172 is capable of preventing the vehicle 1 from departing from the driving lane, even if the person in the vehicle 1 loses the consciousness and falls onto or leans against the steering wheel 141 and thus it is determined that the abnormality condition is satisfied. Specifically, when the person in the vehicle 1 loses the consciousness and falls onto or leans against the steering wheel 141, there is a possibility that the steering wheel 141 is substantially immovable (in other words, fixed) by the unconscious person. As a result, there is a possibility that the steering wheel 141 is not rotatable by the steering actuator 142 and thus the turned wheels that are coupled to the steering wheel 141 cannot be turned. Thus, there is a possibility that the LDA controlling unit 172 cannot prevent the vehicle 1 from departing from the driving lane by controlling the steering actuator 142 when the abnormality condition is satisfied. However, in the first embodiment, the LDA controlling unit 172 prevents the vehicle 1 from departing from the driving lane by controlling the brake actuator 13 that is controllable even if the steering wheel 141 is immovable. Therefore, the LDA controlling unit 172 is capable of appropriately preventing the vehicle 1 from departing from the driving lane even in the situation where the person in the vehicle 1 has any abnormality.

Moreover, a turned amount (especially, a turned amount per unit of time, same is true in the following description) of the vehicle 1 that is realized by controlling the brake actuator 13 is generally larger than a turned amount of the vehicle 1 that is realized by controlling the steering actuator 142. This is because the turned direction of the vehicle 1 is preferably changed relatively moderately in order to suppress anxiety feeling of the person in the vehicle 1 that is caused by a sudden change of the turned direction, when the steering actuator 142 is controlled to prevent the vehicle 1 from departing from the driving lane. Thus, if the brake actuator 13 is controlled to prevent the vehicle 1 from departing from the driving lane in the situation where the abnormality condition is satisfied, it is possible to relatively quickly complete the prevention of the departure of the vehicle 1 from the driving lane in the situation where it is difficult for the person in the vehicle 1 to normally drive the vehicle 1. Therefore, the vehicle 1 travels relatively more safely.

Note that an operational state of the LDA controlling unit 172 is switchable (in other words, can be changed) between an ON state and an OFF state in response to a request from the person in the vehicle 1. The ON state is a state where the LDA controlling unit 172 is allowed to control at least one of the brake actuator 13 and the steering actuator 142 in order to prevent the vehicle 1 from departing from the driving lane. The OFF state is a state where the LDA controlling unit 172 does not control both of the brake actuator 13 and the steering actuator 142 in order to prevent the vehicle 1 from departing from the driving lane. Here, when the operational state of the LDA controlling unit 172 is the OFF state, the LDA controlling unit 172 does not usually control the brake actuator 13 and the steering actuator 142 even if the departure determining unit 171 determines that the departure condition is satisfied. However, if the departure condition and the abnormality condition are satisfied in the situation where the operational state of the LDA controlling unit 172 is the OFF state, the LDA controlling unit 172 may change the operational state of the LDA controlling unit 172 itself from the OFF state to the ON state and then prevent the vehicle 1 from departing from the driving lane by controlling the brake actuator 13. As a result, it is possible to increase an opportunity that the departure of the vehicle 1 from the driving lane is prevented. Note that the LDA controlling unit 172 in the OFF state is configured to monitor the determination result of each of the departure determining unit 171 and the abnormality determining unit 173, if the vehicle 1 uses a method of changing the operational state of the LDA controlling unit 172 to the ON state when the departure condition and the abnormality condition are satisfied in the situation where the operational state of the LDA controlling unit 172 is the OFF state.

Moreover, in the above described description, the LDA controlling unit 172 prevents the vehicle 1 from departing from the driving lane by controlling the brake actuator 13 at the step S116 in FIG. 3. However, the LDA controlling unit 172 may prevent the vehicle 1 from departing from the driving lane by additionally controlling the steering actuator 142 in addition to the brake actuator 13 at the step S116 in FIG. 3. The LDA controlling unit 172 may additionally control the steering actuator 142 in order to make up for a shortage of the turned amount of the vehicle 1 when only the brake actuator 13 cannot generate a desired turned amount that is necessary to prevent the vehicle 1 from departing from the driving lane.

Similarly, in the above described description, the LDA controlling unit 172 prevents the vehicle 1 from departing from the driving lane by controlling the steering actuator 142 at the step S117 in FIG. 3. However, the LDA controlling unit 172 may prevent the vehicle 1 from departing from the driving lane by additionally controlling the brake actuator 13 in addition to the steering actuator 142 at the step S117 in FIG. 3. The LDA controlling unit 172 may additionally control the brake actuator 13 in order to make up for a shortage of the turned amount of the vehicle 1 when only the steering actuator 142 cannot generate a desired turned amount that is necessary to prevent the vehicle 1 from departing from the driving lane.

Moreover, in the above described description, the abnormality determining unit 173 determines on the basis of the image in the vehicle interior (especially, the image of the person in the vehicle 1) whether or not the abnormality condition is satisfied. However, the abnormality determining unit 173 may determine whether or not the abnormality condition is satisfied by using another method. For example, the abnormality determining unit 173 may determine that the abnormality condition is satisfied when the person in the vehicle 1 does not operate the brake pedal 111, the steering wheel 141 and a not-illustrated acceleration pedal for over a fourth predetermined time although the vehicle 1 travels.

As described above, the automatic evacuation operation and the lane departure prevention operation may be performed in parallel. In this case, there is a possibility that the process for automatically evacuating the vehicle 1 (namely, the process at the step S103 in FIG. 2) and the process for preventing the vehicle 1 from departing from the driving lane (namely, the process at the step S116 in FIG. 3) are performed in parallel. However, the ECU 17 may intervene between both of the process for automatically evacuating the vehicle 1 and the process for preventing the vehicle 1 from departing from the driving lane so that one of the process for automatically evacuating the vehicle 1 and the process for preventing the vehicle 1 from departing from the driving lane is performed and the other one of the process for automatically evacuating the vehicle 1 and the process for preventing the vehicle 1 from departing from the driving lane is not performed. For example, the ECU 17 may intervene between both of the process for automatically evacuating the vehicle 1 and the process for preventing the vehicle 1 from departing from the driving lane so that the LDA controlling unit 172 performs the process for preventing the vehicle 1 from departing from the driving lane before the automatic evacuating unit 174 starts the process for automatically evacuating the vehicle 1 and the LDA controlling unit 172 does not perform the process for preventing the vehicle 1 from departing from the driving lane after the automatic evacuating unit 174 starts the process for automatically evacuating the vehicle 1. In this case, the departure of the vehicle 1 from the driving lane is prevented after the abnormality condition is satisfied and before the process for automatically evacuating the vehicle 1 starts.

(2) Second Embodiment

Next, a vehicle 2 in a second embodiment will be described. The vehicle 2 in the second embodiment is different from the vehicle 1 in the first embodiment in that one portion of the lane departure prevention operation in the second embodiment is different from the lane departure prevention operation in the first embodiment. Therefore, with reference to a flowchart illustrated in FIG. 4, the lane departure prevention operation in the second embodiment will be described. Note that a detailed description of a process in the second embodiment that is same as the process in the first embodiment will be omitted by assigning the same step number.

As illustrated in FIG. 4, the above described processed from the step S111 to the step S114 are performed also in the second embodiment.

As a result of the determination at the step S114, if it is determined that the abnormality condition is not satisfied (the step S114: No), the LDA controlling unit 172 determines whether or not the traveling state of the vehicle 1 is the brake priority state (the step S115). As a result of the determination at the step S115, if it is determined that the traveling state of the vehicle 1 is not the brake priority state (the step S115: No), the LDA controlling unit 172 prevents the vehicle 1 from departing from the driving lane by controlling the steering actuator 142 also in the second embodiment, as with the first embodiment (the step S117). On the other hand, as a result of the determination at the step S115, if it is determined that the traveling state of the vehicle 1 is the brake priority state (the step S115: Yes), the LDA controlling unit 172 determines whether or not the brake actuator 13 (alternatively, another component included in a brake controlling system) fails (a step S211).

On the other hand, as a result of the determination at the step S114, if it is determined that the abnormality condition is satisfied (the step S114: Yes), the LDA controlling unit 172 determines whether or not the brake actuator 13 (alternatively, another component included in the brake controlling system) fails (the step S211).

As a result of the determination at the step S211, if it is determined that the brake actuator 13 does not fail (the step S211: No), the LDA controlling unit 172 prevents the vehicle 1 from departing from the driving lane by controlling the brake actuator 13 (the step S116). On the other hand, as a result of the determination at the step S211, if it is determined that the brake actuator 13 fails (the step S211: Yes), the LDA controlling unit 172 prevents the vehicle 1 from departing from the driving lane by controlling the steering actuator 142 instead of controlling the failed brake actuator 13 (the step S117).

The above described lane departure prevention operation in the second embodiment achieves the effect that is same as the effect achieved by the lane departure prevention operation in the first embodiment. Moreover, in the second embodiment, the LDA controlling unit 172 prevents the vehicle 1 from departing from the driving lane by controlling the steering actuator 142 instead of controlling the failed brake actuator 13, if the brake actuator 13 that is the controlled target used to prevent the vehicle 1 from departing from the driving lane fails. Thus, the departure of the vehicle 1 from the driving lane is appropriately prevented even if the brake actuator 13 fails.

Note that the LDA controlling unit 172 may determine whether or not the steering actuator 142 (alternatively, another component included in a steering controlling system) fails before starting to control the steering actuator 142 to prevent the vehicle 1 from departing from the driving lane (namely, before performing the step S117). If it is determined that the steering actuator 142 does not fail, the LDA controlling unit 172 may prevent the vehicle 1 from departing from the driving lane by controlling the steering actuator 142. On the other hand, if it is determined that the steering actuator 142 fails, the LDA controlling unit 172 may prevent the vehicle 1 from departing from the driving lane by controlling the brake actuator 13 instead of controlling the failed steering actuator 142.

(3) Third Embodiment

Next, a vehicle 3 in a third embodiment will be described. The vehicle 3 in the third embodiment is different from the vehicle 1 in the first embodiment in that one portion of the structure of the vehicle 3 is different from the structure of the vehicle 1 and one portion of the lane departure prevention operation in the third embodiment is different from the lane departure prevention operation in the first embodiment. Therefore, with reference to FIG. 5 and FIG. 6, the structure of the vehicle 3 in the third embodiment and the lane departure prevention in the third embodiment will be described. Note that a detailed description of a component of the vehicle 3 that is same as the component of the vehicle 1 in the first embodiment will be omitted by assigning the same reference sign. Note that a detailed description of a process in the third embodiment that is same as the process in the first embodiment will be omitted by assigning the same step number.

(3-1) Structure of Vehicle 3 in Third Embodiment

With referent to a block diagram in FIG. 5, the structure of the vehicle 3 in the third embodiment will be described. As illustrated in FIG. 5, the vehicle 3 is different from the vehicle 1 in that the vehicle 3 has an ECU 37 instead of the ECU 17. The ECU 37 is different from the ECU 17 in that the ECU 37 has a LKA (Lane Keep Assist) controlling unit 375 that is one specific example of the above described "lane keeping device".

The LKA controlling unit 375 is configured to control the steering actuator 142 so that the vehicle 3 travels within (in other words, along) the driving lane on which the vehicle 3 is currently traveling. Note that the LKA controlling unit 375 and the LDA controlling unit 172 have a common characteristics in that each of the LKA controlling unit 375 and the LDA controlling unit 172 is allowed to prevent the vehicle 1 from departing from the driving lane. However, the LKA controlling unit 375 is different from the LDA controlling unit 172 in that the LKA controlling unit 375 controls the steering actuator 142 so that the vehicle 3 travels within the driving lane regardless of the satisfaction of the departure condition and the LDA controlling unit 172 controls at least one of the steering actuator 142 and the brake actuator 13 to prevent the vehicle 3 from departing from the driving lane when the departure condition is satisfied.

(3-2) Flow of Lane Departure Prevention Operation in Third Embodiment

Next, with reference to a flowchart illustrated in FIG. 6, a flow of the lane departure prevention operation in the third embodiment will be described. As illustrated in FIG. 6, the above described processed from the step S111 to the step S114 are performed also in the third embodiment.

As a result of the determination at the step S114, if it is determined that the abnormality condition is not satisfied (the step S114: No), the LDA controlling unit 172 determines whether or not the traveling state of the vehicle 1 is the brake priority state (the step S115). As a result of the determination at the step S115, if it is determined that the traveling state of the vehicle 1 is not the brake priority state (the step S115: No), the LDA controlling unit 172 prevents the vehicle 1 from departing from the driving lane by controlling the steering actuator 142 also in the third embodiment, as with the first embodiment (the step S117). On the other hand, as a result of the determination at the step S115, if it is determined that the traveling state of the vehicle 1 is the brake priority state (the step S115: Yes), the LDA controlling unit 172 determines whether or not the LKA controlling unit 375 controls the steering actuator 142 so that the vehicle 3 travels within the driving lane on which the vehicle 3 is currently travels (a step S311). Namely, the LDA controlling unit 172 determines whether or not the LKA controlling unit 375 is working (the step S311).

On the other hand, as a result of the determination at the step S114, if it is determined that the abnormality condition is satisfied (the step S114: Yes), the LDA controlling unit 172 determines whether or not the LKA controlling unit 375 is working (the step S311).

As a result of the determination at the step S311, if it is determined that the LKA controlling unit 375 is not working (the step S311: No), the LDA controlling unit 172 prevents the vehicle 1 from departing from the driving lane by controlling the brake actuator 13 (the step S116). On the other hand, as a result of the determination at the step S311, if it is determined that the LKA controlling unit 375 is working (the step S311: Yes), the LDA controlling unit 172 prevents the vehicle 1 from departing from the driving lane by controlling, in addition to the brake actuator 13, the steering actuator 142 that is already working under the control of the LKA controlling unit 375 (the step S312). Note that the LKA controlling unit 375 does not control the steering actuator 142 after the LDA controlling unit 172 starts to control the steering actuator 142. Namely, the control by the LDA controlling unit 172 is prioritized more than the control by the LKA controlling unit 375.

The above described lane departure prevention operation in the third embodiment achieves the effect that is same as the effect achieved by the lane departure prevention operation in the first embodiment. Moreover, in the third embodiment, if it is determined that the abnormality condition is satisfied in the situation where the steering actuator 142 is already working under the control of the LKA controlling unit 375, the departure of the vehicle 3 from the driving lane is prevented by allowing the steering actuator 142 that is already working to keep working in addition to controlling the brake actuator 13. Thus, the LDA controlling unit 172 is allowed to prevent the vehicle 3 from departing from the driving lane by controlling both of the brake actuator 13 and the steering actuator 142 without newly allowing the steering actuator 13 to newly start working. Moreover, the LDA controlling unit 172 is allowed to prevent the vehicle 3 from departing from the driving lane without causing the shortage of the turned amount of the vehicle 1 that is necessary to prevent the vehicle 1 from departing from the driving lane, because the LDA controlling 172 is allowed to control both of the brake actuator 13 and the steering actuator 142. In addition, the steering actuator 142 that is already working before the LDA controlling unit 172 starts to control the brake actuator 13 in order to prevent the vehicle 3 from departing from the driving lane keeps working in order to prevent the vehicle 3 from departing from the driving lane. Thus, behavior of the vehicle 3 does not suddenly change due to the termination of the control of the steering actuator 142, compared to the case where the control of the steering actuator 142 is terminated after starting the control of the brake actuator 13 to prevent the vehicle 3 from departing from the driving lane.

At least one portion of the feature in the above described first to third embodiments may be eliminated or modified accordingly. At least one portion of the feature in the above described first to third embodiments may be combined with at least another one portion of the feature in the above described first to third embodiments. At least one portion of the feature in one of the above described first to third embodiments may be combined with at least another one portion of the feature in another one of the above described first to third embodiments.

This application is based upon and claims the benefit of priority of the prior Japanese Patent Application No. 2017-026725, filed on Feb. 16, 2017, the entire contents of which are incorporated herein by reference. In addition, the entire contents of the above described Patent Literature 1 is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A lane departure prevention apparatus, which involve such changes, are also intended to be within the technical scope of the present invention.

REFERENCE SIGNS LIST 1, 2, 3 vehicle
111 brake pedal
112 master cylinder
113FL, 113RL, 113FR, 113RR brake pipe
121FL left front wheel
121RL left rear wheel
121FR right front wheel
121RR right rear wheel
122FL, 122RL, 122FR, 122RR wheel cylinder
13 brake actuator
141 steering wheel
142 steering actuator
151 vehicle speed sensor
152 wheel speed sensor
153 yaw rata sensor
154 acceleration sensor
155 outer camera
156 inner camera
161 display
17 ECU (Electronic Control Unit)
170 data correcting unit
171 departure determining unit
172 LDA controlling unit
173 abnormality determining unit
174 automatic evacuating unit
375 LKA controlling unit
Vv vehicle speed
Vw wheel speed
γ yaw rate
G, Gx, Gy acceleration

The invention claimed is:
1. A lane departure prevention apparatus comprising:
an electronic control unit (ECU), including a processor, programmed to:
determine whether or not a departure condition is satisfied, the departure condition being a condition that there is a possibility that a vehicle departs from a driving lane on which the vehicle is currently traveling;
determine whether or not a predetermined abnormality condition is satisfied, the abnormality condition is a condition that it is difficult for a person in the vehicle to normally drive the vehicle;
based upon a determination that the departure condition and the abnormality condition are satisfied, determine whether or not a braking actuator is failing;
based upon a determination that the braking actuator is not failing, perform a lane departure prevention operation by preventing the vehicle from departing from the driving lane by controlling the braking actuator; and
based upon a determination that the braking actuator is failing, perform the lane departure prevention operation by preventing the vehicle from departing from the driving lane by controlling the steering actuator without controlling the braking apparatus.
2. The lane departure prevention apparatus according to claim 1, wherein, based upon the determination that the departure condition is satisfied, the ECU is further pro- grammed to inform a driver of the departure condition to indicate a possibility that vehicle will depart from the driving lane.

3. The lane departure prevention apparatus according to claim 1, further comprising an inner camera configured to capture image data that represents an inner image in a vehicle interior of the vehicle including a driver, wherein the determination of whether the abnormality condition exists is based on the inner image data.

4. The lane departure prevention apparatus according to claim 3, wherein the ECU is further programmed to perform an automatic evacuation operation after the lane departure prevention operation is performed, wherein the ECU is programmed to:
- calculate a route from a current position of the vehicle to an evacuation position,
- control at least one of the brake actuator and the steering actuator so that the vehicle moves along the calculated route, and
- stop the vehicle at the evacuation position.

\* \* \* \* \*